Sept. 2, 1952 — M. J. UDY — 2,609,272
PROCESS FOR THE TREATMENT OF MATTE TO RECOVER METALLIC SALTS
Filed Dec. 9, 1946
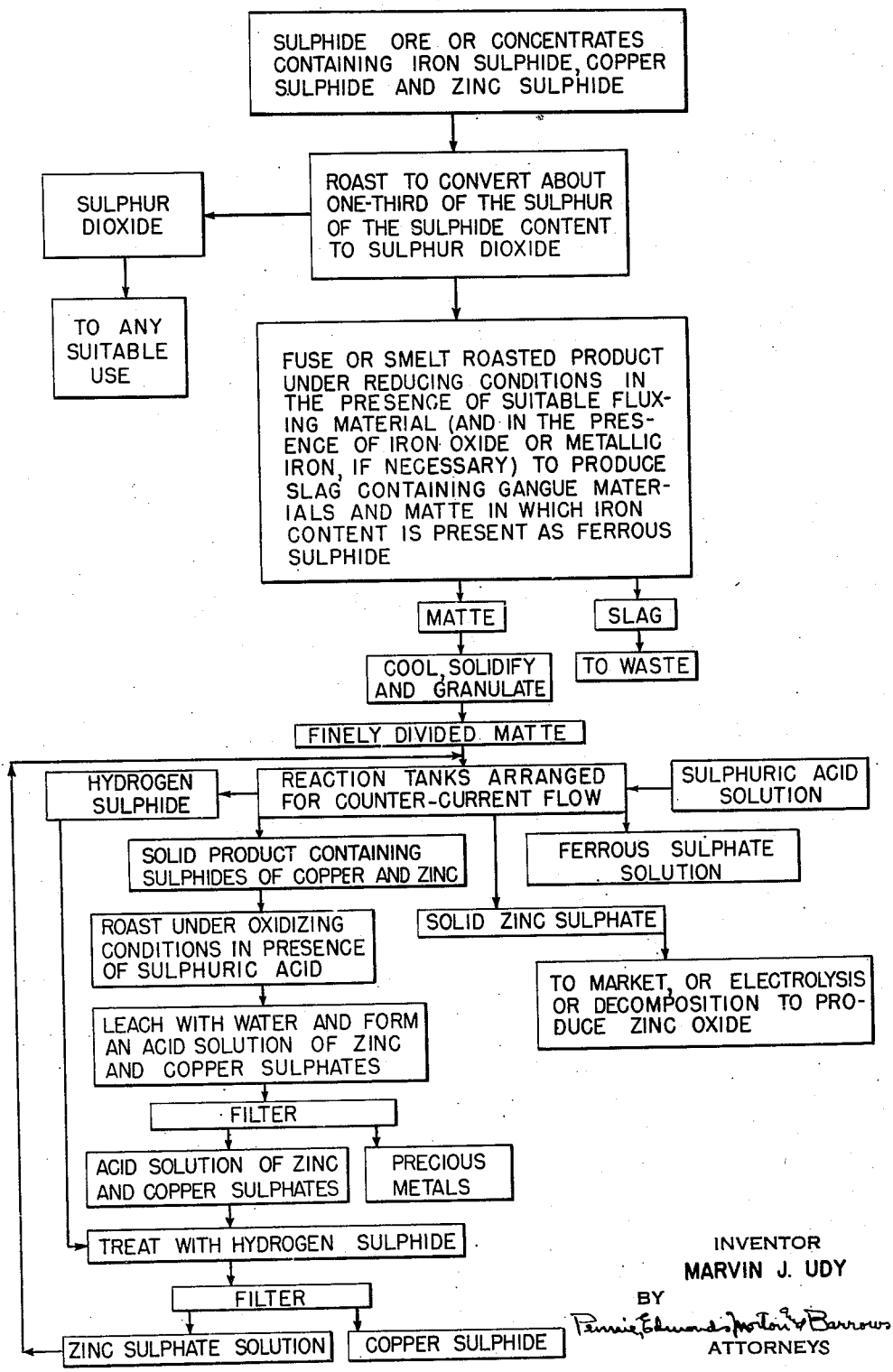
INVENTOR
MARVIN J. UDY
BY
Pennie Edmonds Morton & Barrows
ATTORNEYS Patented Sept. 2, 1952

2,609,272

UNITED STATES PATENT OFFICE 2,609,272

PROCESS FOR THE TREATMENT OF MATTE TO RECOVER METALLIC SALTS

Marvin J. Udy, Niagara Falls, N. Y., assignor to Guaranty Investment Corporation, Limited, Montreal, Quebec, Canada, a corporation of Canada Application December 9, 1946, Serial No. 715,112

4 Claims. (Cl. 23—125)

This invention relates to metallurgy and has for an object the provision of an improved metallurgical method or process. More particularly the invention contemplates the provision of an improved zinc recovery method or process. A specific object of the invention is to provide an improved method or process for separating from the iron contained in iron sulphide-bearing material other elements contained in the iron sulphide-bearing material, particularly zinc, with the production of (1) an aqueous solution containing the iron of the iron sulphide-bearing material and substantially free of other elements contained in the material, (2) gaseous hydrogen sulphide containing sulphur originally combined with iron in the iron sulphide-bearing material and (3) one or more solid products containing substantially all other elements contained in the iron sulphide-bearing material and from which the other elements such as zinc may be recovered readily.

Throughout the specification and claims, the term "ore" is intended to include other iron sulphide-bearing materials such as concentrates as well as crude ore.

The present invention is based in part on my discovery that the other elements contained in iron sulphide-bearing material may be separated effectively from iron contained in the iron sulphide-bearing material by treatment of the material with a mineral acid. Thus, for example, I have found that a matte product containing sulphur, iron, copper, nickel, cobalt, zinc and such other elements as arsenic, antimony, tin, molybdenum, selenium, tellurium, vanadium and precious metals can be digested with an aqueous solution of sulphuric acid to produce (1) an aqueous solution of ferrous sulphate substantially free of all other elements contained in the iron sulphide-bearing material and containing a large proportion or substantially all of the iron of the iron sulphide-bearing material, (2) gaseous hydrogen sulphide containing sulphur combined with iron in the iron sulphide-bearing material and (3) a solid product containing substantially all of the balance of the sulphur of the iron sulphide-bearing material and substantially all other elements contained in the iron sulphide-bearing material. The invention may be employed advantageously in the treatment of iron sulphide-bearing materials containing the elements, zinc and copper to form solid products containing one or more of those elements in concentrated forms and largely free of iron.

I have found, also, that a solution of ferrous sulphate free of zinc can be obtained by treating matte containing iron and zinc sulphides with an aqueous solution of a mineral acid if contact of the matte with the aqueous solution is maintained and reaction continued until the solution becomes neutral or substantially neutral. Zinc of the zinc sulphide may be obtained in a solid residue in the form of zinc sulphide or the zinc may be obtained as zinc sulphate or as zinc sulphide and zinc sulphate.

According to the present invention, ore containing iron sulphide and a sulphide of zinc or sulphides of zinc and copper is smelted with suitable fluxing material to produce a matte containing sulphides of iron and zinc which is soluble in a mineral acid such as sulphuric acid and a separable slag containing the gangue materials of the ore. The matte and slag products are separated, and the matte subsequently is digested with acid to effect the separation of iron from other metals contained therein. Treatment of the matte with an aqueous solution of an acid such as sulphuric acid results in the production of gaseous hydrogen sulphide, an aqueous solution of ferrous sulphate containing a large proportion or substantially all of the iron of the matte and a solid product comprising one or more sulphides of the metals, copper and zinc, together with any precious metals which may be present in the ore. Zinc present in the matte may be converted in the process to solid zinc sulphate. The slag may be wasted or disposed of in any suitable manner.

In practicing the invention, iron sulphide-bearing ore preferably is smelted under such conditions as to produce matte in which the proportion of sulphur to metal does not exceed one atom of sulphur for each atom of metal. For example, a pyritic ore containing iron pyrite ($FeS_2$), and zinc sulphide preferably is smelted under conditions such that the amount and proportion of sulphur in the resulting matte does not exceed one atom of sulphur for each atom of iron (Fe), zinc (Zn) and any other metallic element contained therein. The smelting of a pyritic ore preferably is so conducted that the matte product formed contains a large proportion or substantially all of the iron in the form of ferrous sulphide or in the form of ferrous sulphide and in a lower state of oxidation, all iron pyrite being decomposed.

Smelting may be carried out in any suitable type of furnace, and adjustment of the proportions of sulphur may be carried out in any suitable manner, as, for example, (1) by smelting the ore under oxidizing conditions to oxidize excess sulphur, (2) by smelting a charge comprising the ore, iron oxide and a reducing agent such as coke to reduce the iron oxide to metallic iron and effect chemical combination of the metallic iron with the excess sulphur, or (3) by smelting a charge of the ore in the presence of sufficient metallic iron to combine with the excess sulphur. Smelting of the ore may be carried out under conditions such as to produce a matte product containing free or elemental iron. The production or incorporation of free iron in the final matte product insures the establishment of the proper ratio of sulphur to metal in the matte product. Any suitable amount of metallic iron may be incorporated in the final matte product. Usually, an amount of metallic iron equal to a fraction of one percent of the weight of the matte insures proper solubility of the matte product.

The matte may be subjected to the action of acid in any suitable physical condition and according to any suitable procedure. Preferably, the molten matte produced by smelting sulphide ore is cooled and solidified, and the solidified matte is ground to form a finely divided matte product. The matte may be ground to form a product comprising particles of any suitable size. The time required for completion of the reaction between the acid and the matte depends to some extent upon the sizes of the matte particles, the reaction taking place more rapidly when smaller particles of matte are employed. Generally, reaction between the matte and acid proceeds rapidly to completion when a matte product consisting largely of particles small enough to pass a 100-mesh screen is employed.

Treatment of the matte with acid may be carried out according to any suitable procedure as, for example, in a batch-type operation or in a counter-current type operation, and an aqueous solution of acid of any suitable initial concentration or strength may be employed. Usually, I prefer to employ an aqueous solution of sulphuric acid containing sulphuric acid in such concentration that treatment of the matte with the acid results in consumption of all of the acid of the solution and the production of a neutral or substantially neutral solution of ferrous sulphate, but I may employ an aqueous solution of sulphuric acid containing sulphuric acid in such concentration that treatment of the matte results in consumption of only a portion of the acid of the solution and the production of an aqueous solution of ferrous sulphate containing a small amount of free acid. In the treatment of zinc-bearing matte products, acid should be employed in amounts such that the solutions of ferrous sulphate produced contain not more than about 15 grams of sulphuric acid per liter of water contained in the solutions.

In treating matte with an aqueous solution of sulphuric acid, I prefer to employ a solution of such concentration and to so conduct the acid treatment that a substantially neutral (or acid-free) concentrated solution of ferrous sulphate is produced. Treatment of the matte with acid preferably is carried out at an elevated temperature above about 25° C., and the acid solution employed preferably is of such concentration that the resulting ferrous sulphate solution will be saturated when cooled to 25° C. An aqueous solution of sulphuric acid containing sulphuric acid ($H_2SO_4$) in amount equal to about fifteen to twenty percent of the weight of the solution may be employed advantageously in the treatment of matte containing iron and zinc at temperatures above 25° C. and below the boiling temperature of the liquid. In the treatment of matte containing iron and zinc, it is advisable to employ temperatures below the boiling temperatures of the liquids in order to maintain the liquids saturated with respect to hydrogen sulphide. Boiling results in driving off the hydrogen sulphide rapidly, and, consequently, zinc may be converted to a soluble state. In the treatment of zinc-free matte products such, for example, as matte products containing sulphides of iron and copper, boiling temperatures may be employed. The maximum strength of concentration of the acid solution employed will be determined to some extent by the permissible temperature of treatment, since the concentration of the ferrous sulphate solution produced depends upon the strength or concentration of the acid solution employed and the temperature of treatment.

In the treatment of zinc-bearing matte products, I prefer to conduct the acid treatments at temperatures between about 50° C. and the boiling temperatures of the liquids and to employ acid solutions of such concentrations as to produce concentrated ferrous sulphate solutions from which ferrous sulphate can be crystallized upon cooling to temperatures between the temperature of treatment and about 25° C. I may, however, employ relatively weak acid solutions and produce neutral or substantially neutral solutions of ferrous sulphate from which ferrous sulphate will not crystallize upon cooling to a temperature of 25° C. or lower.

I prefer to treat zinc-bearing matte with acid in a counter-current system, employing a series of tanks or vats, introducing untreated matte into the first tank or vat or other receptacle of the series while introducing the initial aqueous solution of sulphuric acid into the last vat or tank of the series, effecting partial decomposition of the matte and partial consumption of the acid in each tank, passing residual solid material to each of the various vats or tanks in series from the first to the last and passing the acid solution to each of the vats or tanks in series from the last to the first, withdrawing from the first vat or tank a substantially neutral concentrated solution of ferrous sulphate and withdrawing from the last tank or vat a substantially iron-free sulphide-bearing product or a sulphide-bearing product relatively low in iron. I prefer to heat the liquid in the last tank or vat to a temperature of about 70° C. or higher. Heat developed as the result of the reactions maintains the temperature of the liquid in the first tank at about 50° C.

The solid sulphide-bearing product obtained from the last tank or vat in the series may contain zinc sulphide and other metals such as copper, nickel, cobalt, silver, gold and platinum which may be present in the matte subjected to the acid treatment originally. Separation and recovery of the various metals which may be present in the sulphide-bearing product may be carried out in any suitable manner.

In treating zinc-bearing matte in a counter-current system in accordance with the invention, I may recover all or part of the zinc as zinc sulphide in the last tank or vat. When a portion only of the zinc is recovered as zinc sulphide in the last tank or vat, I may recover the remainder of the zinc as zinc sulphate by filtering and thereafter cooling the solution from an intermediate tank or vat to crystallize zinc sulphate contained therein, the supernatant liquor being re-introduced into the system in the next preceding tank or vat. Other metals present in the matte product such, for example, as copper, silver, gold and platinum will be recovered in the last tank or vat.

In the treatment of an iron sulphide-bearing ore containing zinc and copper, the final solid residue resulting from an acid treatment of a matte obtained in smelting the ore may consist of sulphides of zinc and copper. The zinc and copper of such a product may be separated (1) by roasting the product in air to produce a mixture of oxides of copper and zinc, digesting the oxide product with an acid such as sulphuric acid to produce a solution containing sulphates of zinc and copper, and precipitating the copper from such a solution by means of hydrogen sulphide or (2) by roasting the product in air in the presence of sulphuric acid to convert the zinc sulphide and copper sulphide to zinc sulphate and copper sulphate, forming an aqueous solution containing the sulphates and precipitating the copper by treatment of the solution with hydrogen sulphide. Hydrogen sulphide produced in the acid digestion treatment of the matte preferably is employed for precipitating copper.

Copper sulphide is separated from the zinc sulphate solution by decantation or filtration, and the zinc sulphate solution may be returned, in whole or in part, to the system in the acid treatment.

The method or process of the invention may be employed with advantage in the treatment of iron sulphide-bearing materials of all grades. It may be employed with particular advantage in the treatment of iron sulphide-bearing ores or other materials containing relatively small amounts of copper in addition to zinc. Practically quantitative separation and recovery may be accomplished in treating ores containing as little as about two-tenths of one percent (0.2%) or less of a metal such, for example, as copper, nickel, cobalt and zinc. Ferrous sulphate and hydrogen sulphide are produced as substantially pure by-products.

The process of the invention may be employed advantageously to produce valuable compounds of metals such as copper and zinc which are marketable as such or which may be employed in the production of those metals in elemental forms. Thus, for example, a copper-free solution of zinc sulphate produced in the process may be subjected to electrolysis to produce metallic zinc or evaporated to dryness to produce solid zinc sulphate which may be marketed as such or subjected to a decomposition treatment at an elevated temperature to produce solid zinc oxide for marketing or for subsequent reduction to metallic zinc. Copper sulphide produced in accordance with the invention may be subjected to an oxidizing treatment with air or other oxygen-containing gas at an elevated temperature to produce copper oxide or with air or other oxygen containing gas in the presence of sulphuric acid at an elevated temperature to produce copper sulphate. The copper oxide and the copper sulphate may be recovered and marketed as such or they may be utilized as sources of copper in electrolytic processes. Copper oxide and copper sulphate are desirable sources of copper for electrolytic processes, and copper oxide may be reduced directly to metallic copper by means of carbonaceous or non-carbonaceous reducing materials.

In the separation of zinc and copper by treatment of an aqueous solution of the sulphates with hydrogen sulphide, a solution having an acid reaction may be employed advantageously to prevent precipitation of zinc sulphide. An acid solution may be produced by employing an acid aqueous liquid in forming the solution.

The production and acid-treatment of matte in accordance with the invention are illustrated by the following examples:

EXAMPLE I

Ore of the following analysis with respect to nickel, copper, iron and sulphur was smelted with limestone, iron oxide and coke to produce slag and a matte product of the analysis indicated below with respect to nickel, copper, iron and sulphur:

*Ore analysis*

| | Per cent |
|---|---|
| Ni | 1.96 |
| Cu | 1.36 |
| Fe | 16.80 |
| S | 8.55 |

*Matte analysis*

| | Per cent |
|---|---|
| Ni | 5.15 |
| Cu | 3.90 |
| Fe | 62.30 |
| S | 26.40 |

A quantity of matte of the above-indicated composition, weighing three hundred fifty pounds (350 lb.) and containing

| | Pounds |
|---|---|
| Ni | 18.0 |
| Cu | 13.6 |
| Fe | 218.0 |
| S | 92.5 | was ground to form a finely divided product consisting largely of particles small enough to pass a 150-mesh screen, and the finely divided product was treated in a counter-current system with an aqueous solution of sulphuric acid, formed by mixing four hundred pounds (400 lb.) of sulphuric acid ($H_2SO_4$, sp. gr. 1.84) with nineteen hundred fifty pounds (1950 lb.) of water ($H_2O$) at a maximum temperature of 100° C. during a period of about eighty minutes (80 min.).

Treatment of the matte product with the sulphuric acid solution resulted in the production of a solution and a residual matte product of the following compositions:

*Solution*

| | | |
|---|---|---|
| Weight | pounds | 2550 |
| Sp. gr. | | 1.24 |
| Fe | pounds | 214 |
| $FeSO_4$ | do | 582 |
| Ni | | Nil |
| Cu | | Nil |

*Residual matte*

| | Pounds |
|---|---|
| Weight | 52.5 |
| Ni (34.2%) | 18.0 |
| Cu (25.9%) | 13.6 |
| Fe (1.5%) | 0.8 |

EXAMPLE II

Ore of the following analysis with respect to copper, iron and sulphur was smelted with limestone, iron oxide and coke, to produce slag and a matte product of the analysis indicated below with respect to iron, sulphur and copper:

*Ore analysis*

| | Per cent |
|---|---|
| Fe | 32.7 |
| S | 23.6 |
| Cu | 3.6 |

Matte analysis

| | Per cent |
|---|---|
| Fe | 63.00 |
| S | 30.90 |
| Cu | 4.64 |

A quantity of matte of the above-indicated composition, weighing seven hundred seventy-five pounds (775 lb.) and containing

| | Pounds |
|---|---|
| Fe | 487 |
| S | 239 |
| Cu | 36 | was ground to form a finely divided product consisting largely of particles small enough to pass a 100-mesh screen, and the finely divided product was treated in a single digestion tank with an aqueous solution of sulphuric acid, formed by mixing one thousand two hundred sixty pounds (1,260 lb.) of sulphuric acid ($H_2SO_4$, sp. gr. 1.84) with five thousand four hundred pounds (5,400 lb.) of water ($H_2O$), at a maximum temperature of 150° F. during a period of about one and one-half hours.

Treatment of the matte product with sulphuric acid solution resulted in the production of a solution and a residual matte product of the following compositions:

Solution

| | |
|---|---|
| Weight (including wash water) pounds | 7,950 |
| Sp. gr | 1.225 |
| Fe pounds | 480 |
| Cu | Nil |

Residual matte

| | Pounds |
|---|---|
| Weight | 52.7 |
| Fe (1.85%) | 1.0 |
| Cu (64.10%) | 34.0 |
| S (17.70%) | 9.3 |

EXAMPLE III

A quantity of zinc-bearing matte of the following composition was ground to form a finely divided product consisting largely of particles small enough to pass a 100-mesh screen, and the finely divided product was treated in a single digestion receptacle with an aqueous solution of sulphuric acid containing ten percent of sulphuric acid by volume, an excess of matte being employed to insure the production of a substantially neutral solution of ferrous sulphate:

Analysis of matte

| | Per cent |
|---|---|
| Zn | 4.18 |
| Cu | 3.25 |
| Fe | 60.20 |
| S | 32.37 |

The product of the digestion treatment was filtered, the residue was washed with water and a filtrate and a sulphide-bearing residue of the following compositions were obtained:

Analysis of filtrate

| | |
|---|---|
| Fe grams per liter | 79.0 |
| Zn | Trace |
| Cu | Nil |

Analysis of residue

| | Per cent |
|---|---|
| Fe | 22.80 |
| Zn | 14.36 |
| Cu | 11.78 |

EXAMPLE IV

A quantity of zinc-bearing matte of the following composition was ground to form a finely divided product consisting largely of particles small enough to pass a 100-mesh screen, and the finely divided product was digested in a counter-current system with an aqueous solution of sulphuric acid with the production of a neutral solution of ferrous sulphate:

Analysis of matte

| | Per cent |
|---|---|
| Cu | 5.0 |
| Zn | 4.5 |
| Fe | 58.8 |
| S | 31.2 |

The digestion solution was cooled at a point intermediate the first and last digestion receptacles to precipitate or crystallize zinc sulphate formed in the digestion treatment.

A substantially neutral ferrous sulphate solution free of copper and zinc was withdrawn from the first receptacle.

A sulphide residue of the following composition and beneficiated with respect to zinc was withdrawn from the last receptacle:

| | Per cent |
|---|---|
| Cu | 21.10 |
| Zn | 8.05 |
| Fe | 14.40 |

The sulphide residue contained 42.2% of the zinc of the original matte and 57.8% of the zinc of the original matte was recovered in the form of zinc sulphate.

A preferred process of the invention is illustrated in the accompanying flow sheet.

I claim:

1. The method of recovering zinc from matte containing sulphides of iron and zinc which comprises digesting the matte in finely divided form with an aqueous solution of sulphuric acid in a counter-current system comprising a series of receptacles, the sulphuric acid being of such concentration as to produce a substantially neutral solution of ferrous sulphate when reacted with the iron sulphide of the matte by introducing untreated matte into the first receptacle of the series and introducing the solution of sulphuric acid initially into the last receptacle of the series, effecting partial decomposition of the matte and partial consumption of the acid solution in each receptacle, withdrawing the substantially neutral solution of ferrous sulphate from the first receptacle, continuing the digestion treatment by passing residual solid material to each of the various receptacles in series from the first to the last and passing the acid solution to each of the receptacles in series from the last to the first, cooling the acid solution at a point intermediate the last and first receptacles to crystallize and recover a portion of the zinc of the matte as zinc sulphate, withdrawing from the last receptacle a solid residue containing the remainder of the zinc of the matte in the form of zinc sulphide and treating the solid residue to recover a zinc product therefrom.

2. The method of recovering zinc from matte containing sulphides of iron and zinc which comprises digesting the matte with an aqueous solution of sulphuric acid in such an amount that there is produced a concentrated, substantially neutral solution of ferrous sulfate substantially free of all elements other than iron originally present in the matte, gaseous hydrogen sulphide containing sulfur originally combined with iron in the matte, and a solid residue containing all of the zinc and a portion of the iron originally present in the matte, withdrawing the solution of ferrous sulfate, passing the residual solid material into contact with an aqueous solution of sulfuric acid in such amount that there is produced an acid solution containing the remaining iron of the matte as ferrous sulfate and a portion of the zinc of the matte as zinc sulfate, and a residue containing the remainder of the zinc as zinc sulfide, withdrawing the acid solution and cooling it to crystallize zinc sulfate, employing the acid mother liquor as the aqueous sulfuric acid solution in the first mentioned digestion step, and treating the zinc sulphide-containing residue to recover a zinc product therefrom.

3. The method of recovering zinc from matte containing sulphides of iron, copper and zinc which comprises digesting the matte with an aqueous solution of sulphuric acid in such an amount that there is produced a concentrated, substantially neutral solution of ferrous sulphate substantially free of all elements other than iron originally present in the matte, gaseous hydrogen sulphide containing sulphur originally combined with iron in the matte, and a solid residue containing all of the zinc and copper and a portion of the iron originally present in the matte, withdrawing the solution of ferrous sulphate, passing the residual solid material into contact with an aqueous solution of sulphuric acid in such amount that there is produced an acid solution containing the remaining iron of the matte as ferrous sulphate and a portion of the zinc of the matte as zinc sulphate, and a residue containing the remainder of the zinc as zinc sulphide and the copper as copper sulphide, withdrawing the acid solution and cooling it to crystallize zinc sulphate, employing the acid mother liquor as the aqueous sulphuric acid solution in the first mentioned digestion step, and treating the zinc sulphide-containing residue to recover a zinc product therefrom.

4. The method of recovering zinc from sulphide bearing material containing gangue material and sulphides of iron and zinc which comprises smelting the sulphide-bearing material under such conditions as to produce molten slag containing the gangue material and molten, acid-soluble matte containing the iron and zinc in sulphide forms, converting the matte to a solid, finely divided condition, digesting the matte with an aqueous solution of sulphuric acid in such an amount that there is produced a concentrated substantially saturated solution of ferrous sulphate saturated with respect to hydrogen sulphide and otherwise substantially free of all elements other than iron originally present in the matte, gaseous hydrogen sulphide containing sulphur originally combined with iron in the matte, and a solid residue containing all of the zinc and a portion of the iron originally present in the matte, withdrawing the solution of ferrous sulphate, passing the residual solid material into contact with an aqueous solution of sulphuric acid in such amount that there is produced an acid solution containing the remaining iron of the matte as ferrous sulphate and a portion of the zinc of the matte as zinc sulphate, and a residue containing the remainder of the zinc as zinc sulphide, withdrawing the acid solution and cooling it to crystallize zinc sulphate, employing the acid mother liquor as the aqueous sulphuric acid solution in the first mentioned digestion step, and treating the zinc sulphide-containing residue to recover a zinc product therefrom.

MARVIN J. UDY.

REFERENCES CITED

The following references are of record in the file of this patent:

UNITED STATES PATENTS

| Number | Name | Date |
|---|---|---|
| 203,849 | Parnell | May 21, 1878 |
| 1,477,478 | Elton et al. | Dec. 11, 1923 |
| 1,937,636 | Christensen | Dec. 5, 1933 |
| 2,424,866 | Udy | July 29, 1947 |

OTHER REFERENCES

Seidell, Solubilities of Inorganic and Organic Compounds, 2nd ed., 2nd printing, D. Van Nostrand, N. Y. (1919), vol. 1, pp. 343 and 754.